Feb. 26, 1952          F. FISHER          2,587,453
FEATHER PLUCKING APPARATUS
Filed Oct. 6, 1949          2 SHEETS—SHEET 1
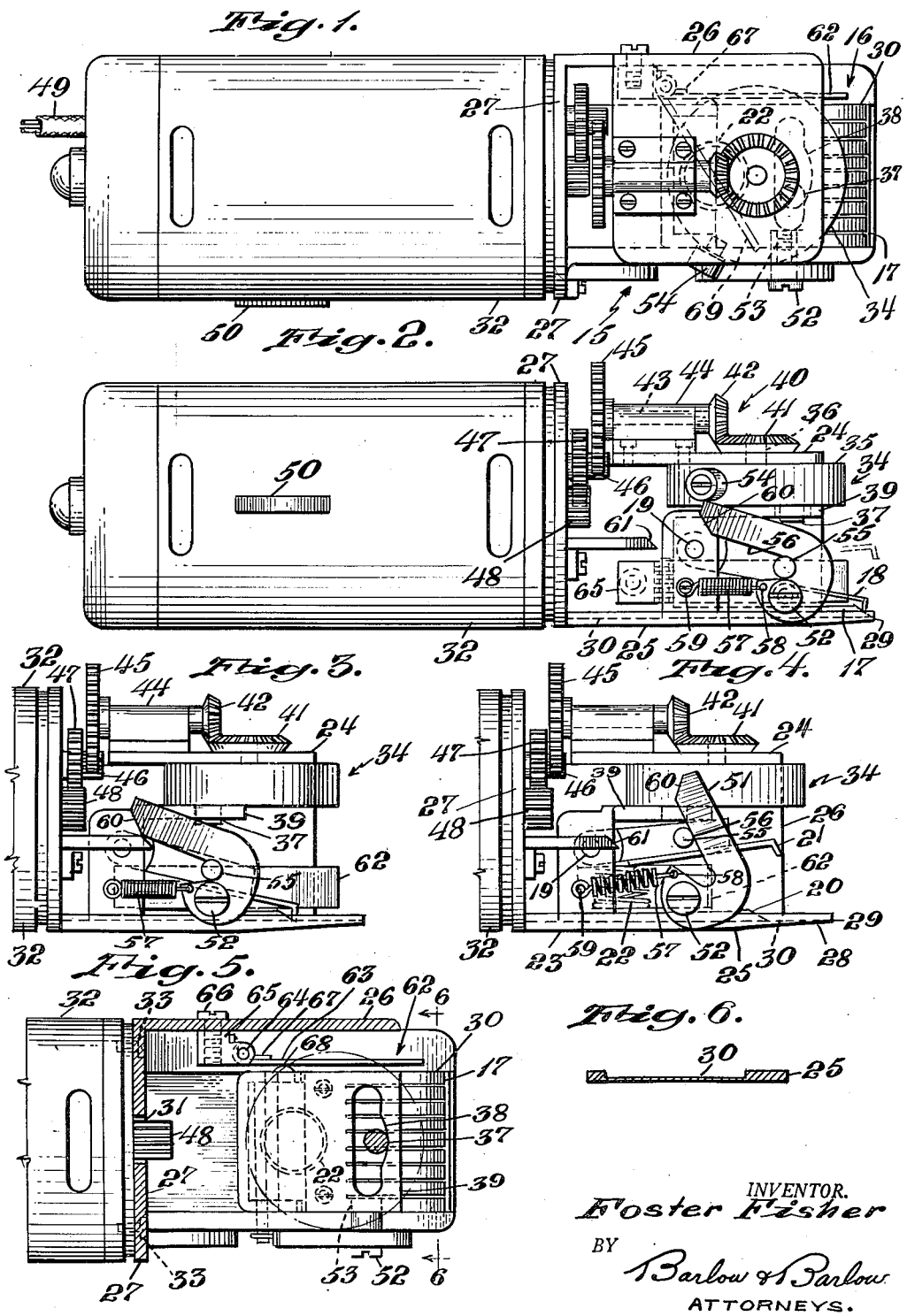
INVENTOR.
Foster Fisher
BY Barlow & Barlow
ATTORNEYS.

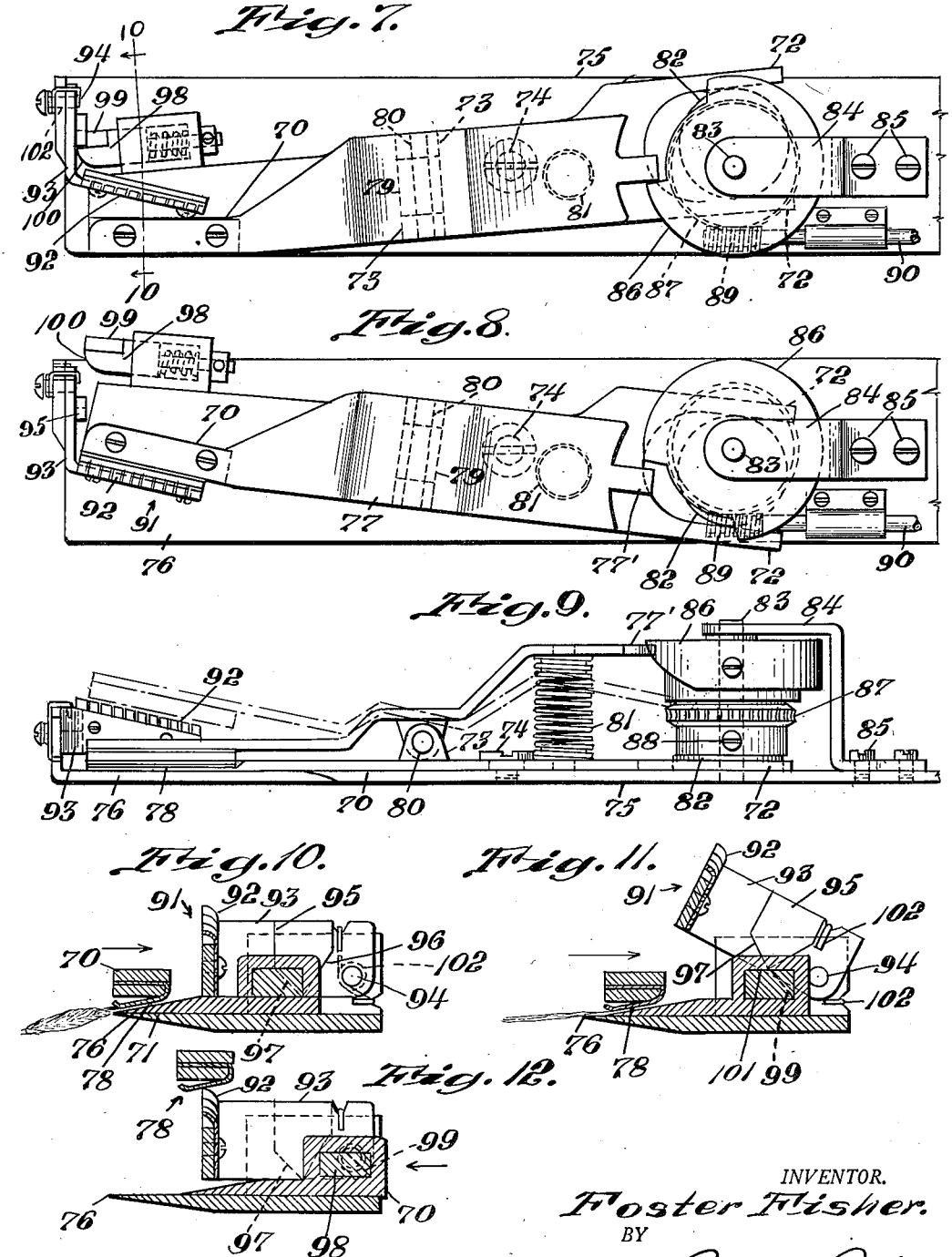

Patented Feb. 26, 1952

2,587,453

UNITED STATES PATENT OFFICE 2,587,453

FEATHER PLUCKING APPARATUS

Foster Fisher, Providence, R. I.

Application October 6, 1949, Serial No. 119,913

6 Claims. (Cl. 17—11.1)

This invention relates to a feather plucking apparatus.

It is desirable to pluck feathers in the dry state from birds such as poultry which results in dressed poultry having a much better appearance, particularly in the color of the skin, than that which is possible by the usual scalding method of plucking which is usually employed.

An object of this invention is to provide an apparatus of the above character wherein the feathers will be plucked in the dry state from a bird and in which the feather gripping members of the apparatus will be constructed so as to remove even the finest of pin feathers.

Another object of the invention is to provide an apparatus of the above character which will be of a size to be conveniently held in the hand to be manually moved into the feathers of the birds and which will operate in a rapid manner so as to quickly remove all feathers from the bird being plucked.

Another object of the invention is to provide an apparatus of the above character having a construction so that the feather gripping members will be mounted for reciprocation and will be freed of such feathers which may adhere to the said members on one stroke thereof.

With these and other objects in view, the invention consists of certain novel features of construction, as will be more fully described and particularly pointed out in the appended claims.

In the accompanying drawings:

Figure 1 is a top view of a plucking apparatus embodying my invention;

Figure 2 is a side view of the apparatus shown in Figure 1;

Figure 3 is a side view of a fragmental portion of the apparatus showing the feather plucking members in a feather engaging position;

Figure 4 is a view similar to Figure 3 showing the feather plucking members in the open position;

Figure 5 is a plan view of a fragmental portion of the apparatus shown in part section;

Figure 6 is a sectional view of the support taken substantially along line 6—6 of Figure 5;

Figure 7 is a plan view of a modified construction of apparatus;

Figure 8 is a similar view showing the feather lucking members in their position at the end of the plucking stroke thereof;

Figure 9 is a side elevational view thereof;

Figure 10 is a sectional view taken substantially along line 10—10 of Figure 7;

Figure 11 is a similar section view showing the brush portion of the device in the elevated position whereby the feather gripping member may pass therebetween; and Figure 12 is also a similar view showing the open jaws of the feather gripping member as passing over the brush elements shown in Figure 11.

Referring to the drawings for a more detailed description of the invention, 15 designates generally a feather plucking apparatus of a size to be conveniently held in the hand to be moved into the feathers of the birds to be plucked. The apparatus comprises a feather gripping member designated generally 16 having a lower jaw 17 and an upper resilient jaw 18 which is pivotally supported relative to the said lower jaw by means of a pivot pin 19. The lower jaw has a knife edge 20 so that the same may be moved in very close to the quill of even the very finest pin feathers. The upper jaw has its free end portion 21 thereof turned inwardly to engage any such feathers which may be positioned on the said lower jaw. A compression spring 22 is interposed between the said jaws to separate the jaws or move them to open position.

The member 16 is mounted for reciprocal movement on a support bracket 23 which has a top, bottom, side, and end walls 24, 25, 26 and 27 respectively. The lower side of the bottom wall 25 is tapered as at 28 towards the front edge thereof providing a substantial knife edge 29 and has a recess 30 therein (see Figure 6) in which the member 16 is guided by the walls of said recess in the reciprocation of said member 16. The said end wall 27 has a central opening 31 therein and is attached to the side of the driving end of a motor power source 32 such as by cap screws 33 (see Figure 5).

The gripping member 16 is reciprocated by means of a cam 34 which comprises a disc 35 having a shaft 36 journalled for rotation in the wall 24 of the bracket 23. A pin 37 which is eccentrically mounted on the lower side of said disc 35 projects therefrom into engagement with the walls of a cam slot 38, which slot extends into the upper wall 39 of the lower jaw 17. The wall 39 extends into close adjacency to the lower side of the disc 35 so as to prevent vertical movement of said member 16. The cam 34 is rotated by means of a train of gears designated generally 40 which include a bevel gear 41 which is fixed to the shaft 36 and engages with a bevel gear pinion 42 carried by a shaft 43 journalled in a bearing 44 attached to the upper wall 24. The other end of the shaft 43 carries a gear 45 which engages with a pinion gear 46 secured to rotate with a gear 47 rotated by a pinion 48 attached to the drive shaft of the motor 32 and which pinion gear 48 projects through the opening 31 in the bracket 23.

The motor 32 has the usual electrical conductors 49 provided with a proper plug connector (not shown) to engage with a convenient outlet of an electrical power source (also not shown). The motor is also provided with a switch 50 operable to close or open the motor electric circuit in a well-known manner. With the motor in motion, the cam 34 will be rotated and the feather gripping member 16 will be reciprocated in its guide by means of the crank pin 37 and cam slot 38 in an obvious manner.

It is desirable that the jaws 17 and 18 be kept in the feather gripping relation for substantially the entire pulling stroke thereof. To this end, a lever or the like 51 is pivotally mounted on the lower jaw 17 such as by means of a pivot stud 52 extending through the lever 51 and threadedly engaging a boss 53 on the said lower jaw. A roller 54 is mounted on the periphery of the disc 35 and the lever 51 is arranged to extend into the path of movement of said roller 54 to be engaged on one side thereof to be moved in a counter-clockwise direction, as seen in Figure 2. The upper jaw 18 carries a pin 55 which projects from the side thereof into engagement with the side 56 of the lever 51 and is moved thereby to move the said upper jaw 18 toward the closed or feather engaging position with the lower jaw 17 against the tension of the spring 22. A pull spring 57 is attached to the lever 51 as at 58 and at the other end thereof to any convenient location on the lower jaw such as at 59 so as to bias the lever into engagement with the pin 55. At the closed or feather engaging position of the upper jaw, the said pin 55 will be at the position shown in Figure 2 which will be directly in line with the center of the stud 52 and counteract the force exerted by the spring 22 tending to swing the lever 51 about its pivot 52, and the upper jaw will be locked into feather engaging position during the pulling stroke of the member 16.

At or nearly at the end of the said pulling stroke the end 60 of the lever 51 will be moved into engagement with a trip member 61 and be moved thereby to be swung about its pivotal mounting to release the pin 55 and permit the jaws 18 to be moved to the open position by means of the compression spring 22. The spacing of the roller 54 with relation to the crank pin 37 and the shaping of the cam slot 38 is such that a pause of ample period is provided at the end of the forward stroke of the member 16 to permit the closing of the jaw 18 prior to the start of the rearwardly or pulling stroke of the said member 16.

Upon the opening of the jaws 17, 18 at the end of the pulling stroke, the feathers held therebetween will be released to be discharged from the apparatus; however, to assure the discharge of such feathers upon the opening of said jaws, a brush or the like member 62 (see Figure 5) is provided. The member 62 is in the present embodiment arranged to be moved between the open jaws to engage and dislodge such feathers which may adhere to the said jaws. The member 62 comprises an arm 63 hingedly secured as at 64 to a bracket 65 which is secured to the wall 26 such as by means of a cap screw 66. A torsion spring 67 is coiled about the pivot 64 and has one arm abutting against the bracket 65 and the other arm pressing against the member 62 so as to exert a force thereon tending to move the arm toward said jaws. The lower jaw 17 carries an abutment 68 (see Figure 5) which projects outwardly from the said jaw at a location to engage the arm 63. When the jaws are in the forward or feather engaging position, the said arm 63 will be engaged by said abutment 68 on the right of said pivot 64, as viewed in Figure 5, thereby retaining said arm 63 from being moved by said spring 67. At or nearly at the end of the pulling stroke of said member 16, the abutment will have been moved to the left of the pivot 64 thereby freeing the spring 67 to exert its force on the arm 63 to sweep the same between the now open jaws, as shown in dot and dash lines 69 in Figure 1.

In Figures 7-12, I have shown a modified construction in which the lower plucking jaw comprises a lever 70 having a knife edge 71 at one end portion thereof (see Figures 10-12) and bifurcated at the other end portion thereof to provide arms 72 (see Figures 7-8). The lever 70 is also provided with spaced ears 73 extending from the upper side thereof at a position thereon located intermediate the ends of the lever and is pivotally attached as at 74 to a support comprising a plate 75 having a knife edge portion 76 over which the knife edge 71 of the lower jaw moves (see Figures 10-12).

The upper feather engaging jaw is also in the form of a lever 77 having a resilient feather engaging portion 78 (see Figures 10, 11) and a single ear 79 extending from the lower side thereof to be positioned between the ears 73. Each of the said ears are apertured and receives therethrough a mounting pin 80 to pivotally secure the said upper jaw to the lower jaw. A compression spring 81 is interposed between the said jaws to bias the upper jaw to feather engaging relation with the said lower jaw. The arms 72 of the lower jaw extends into engagement with a cam which is in the form of an eccentric disc 82 mounted on a shaft 83 which is journalled at one end in the base 75 and at the other in a bracket 84 which is secured to the said plate 75 such as by means of cap screws 85. Rotation of the disc 82 will reciprocate or oscillate lever 70 about the pivot 74. The end portion 77' of lever 77 extends to be in position to be engaged by a cam 86 to swing said lever about its pivot 80 to separate the feather gripping end thereof to move the same from feather engaging position to the open position against the tension of the spring 81. The cam 86 is also mounted upon the shaft 83 so as to rotate therewith. The shaft 83 is rotated by means of a worm wheel 87 attached thereto as by a set screw 88 and meshes with a worm 89 carried by a shaft 90 which may be rotated from any suitable power source (now shown.)

In the operation of the modified apparatus so far described, the knife edge 71 of the lower jaw is moved into the feathers of the birds to be plucked. During the oscillation of said jaws the upper jaw 77 will close upon such feathers which may be positioned between the jaws and pull the same free of the bird. The timing of the cams 86, 82 is so arranged that the jaw will move rearwardly in the closed position to provide a feather pulling stroke and at the end of the pulling stroke the cam 86 will be at a position to engage portion 77' to separate the jaws and hold them in the separated or open position on the return stroke of the jaws.

Upon the opening of the jaws such feathers held therebetween will be free to escape; however, to assure that such feathers will be released from between the jaws, a brush and/or the like member 91 is also arranged to be relatively moved between the said jaws when in the open position during the return stroke thereof. Member 91 comprises a resilient metal strip 92 mounted on a suitable L-shaped arm 93 which is pivotally mounted on the plate 75 as at 94. The strip 92 is wedge-shaped and extends into the path of movement of the gripping surfaces of the plucking jaw and conforms substantially to the shape of the opening between said jaws when said jaws are in the open position (see Figure 9). The arm 93 carries a wedge-shaped abutment 95 having inclined sides 96 and 97 which are engaged by a spring-pressed plunger 98 carried by the lower jaw 70. The plunger 98 is generally rectangular in cross section and has a slanted cam surface 99 on one side thereof and a rounded cam surface 100 on the opposite side (see Figure 7).

In the rearward or feather pulling stroke of the said jaws, the slanted surface 99 of the plunger 98 will engage the cam surface 97 of the abutment 95 (see Figure 10) and swing the arm 93 about its pivot 94 to elevate the member 91 out of the path of movement of the closed jaws on the feather pulling stroke thereof, (see Figure 11). The abutment 95 will ride upon the upper surface 101 of the plunger 98 (see Figure 11) and maintain the member 91 in the elevated position until the closed jaws have reached almost the end of the pulling stroke, at which time the abutment 95 will ride off the side 101 and will be moved to the initial position by means of a torsion spring 102 coiled about the pivot 94 extending into engagement with the arm 93. Upon the return stroke of the feather pulling jaws, the upper jaw will be in the open position and passed over the upper side of the member 92 and the lower jaw will pass beneath the lower side of said member 92 whereby any feathers adhering to said jaw will be scraped and dislodged therefrom.

I claim:

1. In an apparatus for plucking feathers, a first jaw having a slot therein and mounted for reciprocal movement, cam means engaging with said slot for reciprocating said jaw, a second jaw carried by said first jaw for movement therewith and pivotally mounted thereon for movement toward and from said first jaw, a spring interposed between said jaws for biasing said second jaw for movement from said first jaw, and cam means engaging said second jaw for moving the same toward said first jaw into feather gripping relation therewith, and a brush pivotally mounted for movement out of the path of movement of said jaws on the plucking stroke thereof and movable into the path of movement of said jaws on the return stroke thereof for engaging said jaws to remove therefrom feathers which may have adhered thereto.

2. In an apparatus for plucking feathers, a first jaw mounted for reciprocal movement, cam means for reciprocating said jaw, a second jaw pivotally mounted on said first jaw for movement toward and from said first jaw, a spring interposed between said jaws for relative resilient movement thereof, cam means for moving said jaws toward each other into feather gripping relation, a pivotally mounted brush and means for effecting relative movement between said jaws and brush for removing such feathers which may have adhered to said jaws.

3. In an apparatus for plucking feathers, a support having a recess therein, a first jaw mounted in said recess for reciprocal movement therein, cam means engaging said jaw for reciprocating the same, a second jaw carried by said first jaw and pivotally mounted thereon for movement toward and from said first jaw, a spring interposed between said jaws for biasing said second jaw for movement from said first jaw, a pivoted lever, and means carried by said cam engaging said lever for moving the same about its pivot, a pin extending from said second jaw into the path of movement of said lever to be engaged thereby to move said second jaw toward said first jaw into feather gripping relation therewith.

4. In an apparatus for plucking feathers, a first jaw mounted for reciprocal movement, cam means for reciprocating said jaw, a second jaw pivotally mounted on said first jaw for movement toward and from said first jaw, a spring interposed between said jaws for biasing said second jaw for movement from said first jaw, cam means for moving said second jaw toward said first jaw into feather gripping relation therewith, and a brush pivotally mounted and spring urged to be moved between said jaws for removing such feathers which may have adhered to said jaws, and means carried by said jaws at a position to engage said brush to move the same from between said jaws upon the return stroke of said jaws.

5. In an apparatus for plucking feathers, a support, a first jaw movably mounted on said support, a second jaw carried by said first jaw movable therewith and movably mounted thereon for movement to and from said first jaw, means engaging said second jaw for moving the same into feather gripping position, cam means engaging said first jaw for moving said jaws in unison on the plucking and return stroke of said jaws, and a brush pivotally mounted on said support for movement out of the path of movement of said jaws on the plucking stroke thereof and movable in the path of movement of said jaws on the return stroke thereof for engaging said jaws to remove feathers therefrom which may have adhered thereto.

6. In an apparatus for plucking feathers, a support, a first jaw having a slot therein and mounted on said support for reciprocal movement thereon, a rotary member having a pin eccentrically mounted thereon projecting into engagement with said slot for reciprocating said jaw, a second jaw carried by said first jaw and movable therewith and pivotally mounted thereon for movement toward and from said first jaw, a spring interposed between said jaws for biasing said second jaw for movement from said first jaw, said second jaw having a pin projecting therefrom, a pivoted lock lever biased into engagement with said pin and rockable to move said second jaw into feather engaging position with said first jaw and interlocked with said pin to hold said jaw in the said feather engaging position, a roller carried by said rotary member to engage said lever to move the same into interlocking relation with said pin and a trip finger positioned to be engaged by said lever near the end of the plucking stroke of said jaws to release the same to permit opening of said jaws.

FOSTER FISHER.

REFERENCES CITED

The following references are of record in the file of this patent:

UNITED STATES PATENTS

| Number | Name | Date |
| --- | --- | --- |
| 331,906 | Peterhansl | Dec. 8, 1885 |
| 1,939,469 | Simons | Dec. 12, 1933 |
| 2,113,232 | Hinchliffe | Apr. 5, 1938 |
| 2,268,581 | Fisher | Jan. 6, 1942 |